Figure 1:
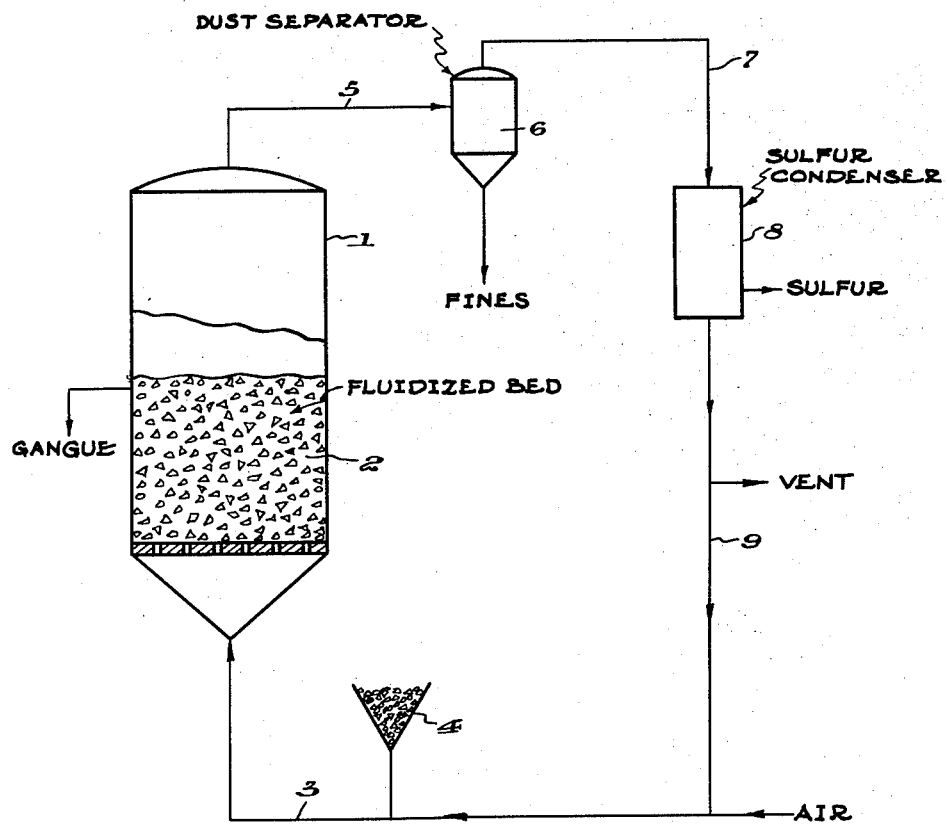

INVENTORS.
DAVID K. EADS, &
HARRY W. HAINES, JR.

United States Patent Office 3,102,792
Patented Sept. 3, 1963

3,102,792
RECOVERY OF SULFUR FROM NATIVE ORES
David K. Eads, Allison Park, Pa., and Harry W. Haines, Jr., Houston, Tex., assignors to Texas Gulf Sulphur Company, New York, N.Y., a corporation of Texas
Filed Feb. 14, 1956, Ser. No. 565,357
5 Claims. (Cl. 23—294)

This invention relates to the recovery of sulfur from native ores containing it, wholly or predominantly, as elemental or uncombined, sulfur (non-sulfide ores).

Present practices for sulfur recovery from such native ores all possess shortcomings such that a better procedure, from economic and engineering standpoints, is needed. Thus, distillation of sulfur from such an ore has been carried out in externally heated retorts. The recovery of sulfur is about 85 percent while heat utilization is about 75 percent. The process is discontinuous, and a large amount of manual labor is required. Economic application of this process depends upon cheap fuel and labor.

Another procedure is to treat the ore in an autoclave with superheated water, to displace molten sulfur from the gangue. Practical experience has shown that the separation of sulfur is incomplete and erratic with recovery seldom exceeding 55 percent for ores containing as much as 60 percent of elemental sulfur. This operation is likewise intermittent.

Solvent extraction with carbon disulfide has been applied in Germany to the recovery of sulfur from these ores. About 95 percent of the uncombined sulfur may be recovered in this way in a state of good purity. The method is seriously affected, however, by engineering difficulties involving the fact that the ignition point of the solvent is very low, and it is susceptible to electric shock and subject to quick explosion. Moreover, $CS_2$ is highly toxic and thus its use creates danger to personnel in case of leaks, whether of major or minor character. Consequently, extreme caution must be exercised in applying this practice. A further disadvantage is that the product retains the offensive odor of carbon disulfide, which is very difficult to remove.

Still another treatment involves the application of flotation, which requires very fine grinding, e.g., to 325-mesh, with attendant cost. Although sulfur is readily wettable, experience has shown that the product is contaminated by an amount of gangue particles, and further losses result from the carrying of some portion of the sulfur in the tailings. The economy of this procedure is very poor.

Again, special types of furnaces have been employed in Italy and Sicily for the refining of native ores. In their operation part of the sulfur is burned for melting the remainder. The operations are manual and slow due to the necessity for bringing the charge to heat, melting the sulfur, and the cooling, emptying and refilling of the furnace. The yields are generally low and the product quality is not always satisfactory.

A major object of the present invention is to provide a method of recovering sulfur from native ores in which it is present as free sulfur that is simple, highly efficient, economical, makes use of simple and readily available equipment adapted to continuous operation, requires little manual labor, affords excellent heat transfer and heat control, and avoids disadvantages of the prior art methods of treating native sulfur ores.

Other objects will appear from the following specification.

Figure 2:
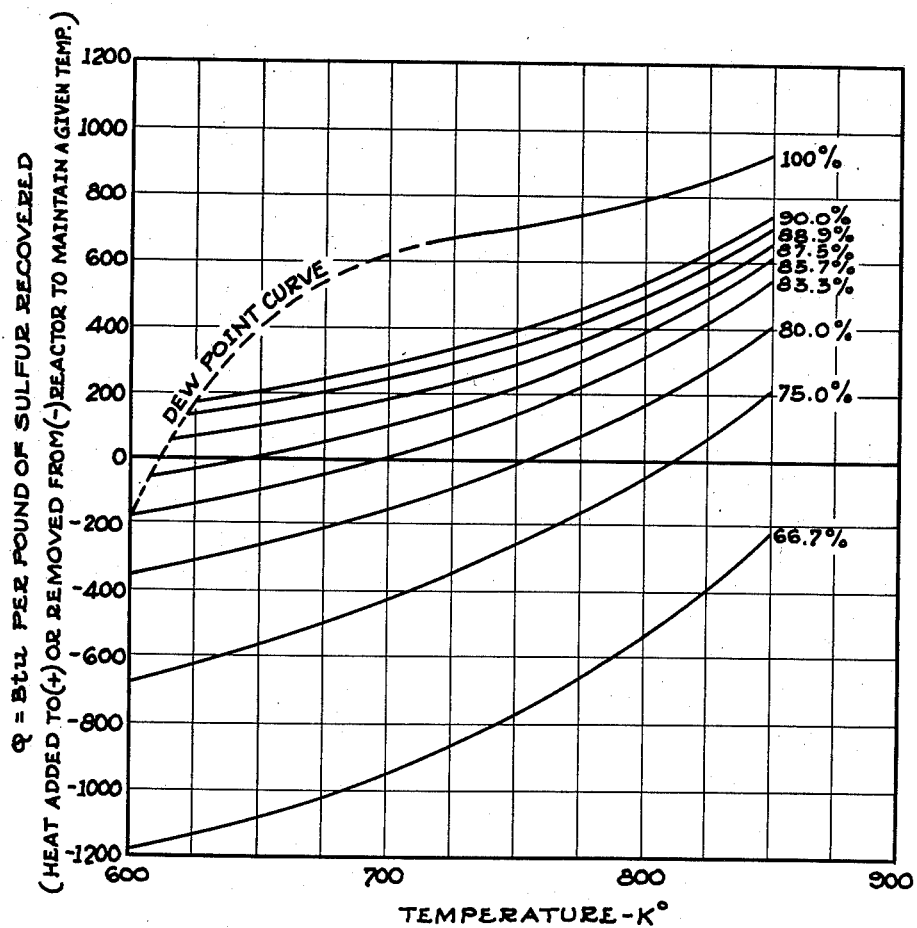

The invention will be described with reference to the accompanying drawings in which FIG. 1 is a schematic representation of apparatus for performing one embodiment of the invention; and FIG. 2 is a series of curves showing how the heat balance conditions may be controlled in accordance with the invention as applied to an ore containing 34.8 percent of uncombined sulfur.

This invention makes use of fluidizing principles coupled with flexible control of thermal conditions within the reactor according to predetermined requirements.

The native sulfur ores containing free, uncombined sulfur tend to become gummy and sticky and to agglomerate when heated. Consequently, they are not directly amenable to distillation of their sulfur contents by fluidization procedures. We have discovered, however, that such ores may be treated satisfactorily if the fluidized bed contains a proportion of inert inorganic material that is pulverulent and does not fuse or agglomerate under the temperature conditions in the bed. In other words, excellent sulfur recovery is to be had while avoiding agglomeration of a fluidized bed to which native sulfur ore is fed provided the bed contains a sufficient amount of inert material of the type just identified. Examples of suitable inert materials are silica, gangue produced from the ore in the practice of the invention, crushed common bricks, and the like.

FIG. 1 illustrates one embodiment of the invention. Assuming the system to be in operation, the native ore in finely divided form is fed continuously in any suitable manner to a vertical reactor 1 to maintain a bed 2 through which there is passed upwardly from a conduit 3 a heating gas, in this case air, at a velocity such as to cause the bed to behave as a dense fluidized suspension. The finely divided ore is fed to the bed from any appropriate source, as by passing it from a hopper 4 into the heating gas stream. The ore in the fluidized bed is brought by the heating gas to a temperature above the dew point of sulfur, under the conditions prevailing in the reactor, and such as to vaporize sulfur from it. The product gases, in this case sulfur, $SO_2$ and $N_2$, with any residual $O_2$, are removed from above the bed through a conduit 5 and passed to a dust separator 6, which may be a conventional cyclone separator or a Cottrell precipitator, to remove fine ore or gangue particles from the gases. The product gases pass thence through a conduit 7 to a sulfur condenser 8 of any desired type from which liquid sulfur is withdrawn. Gangue is withdrawn continuously from bed 2 in accordance with conventional fluidizing practices.

Starting-up of the unit is very simple. The bed will be inert material, such as gangue from a preceding operation, and it will be preheated to the ignition temperature of sulfur, i.e., at least to about 260° C., as by means of an oil or gas torch, not shown, mounted in the reactor wall. Fluidizing of the bed, at least at intervals, is desirable to ensure faster and more uniform heating. When the bed is at temperature the external heating is discontinued and ore and air are then fed continuously, as described above, at the desired proportions. Alternatively, the reactor walls may be heated to a relatively high temperature, say 500° to 700° C., and ore and air then charged with burning of all, or substantially all, of the sulfur until a suitable bed of heated gangue has been formed, followed by regular operating procedure as described above. Shutdown is equally simple, being effected merely by discontinuance of the ore feed and heating gas. Restarting after shutdown will depend upon existing conditions in the reactor. If it contains a bed at a temperature above 260° C., all that is necessary is to resume the feeds of ore and heating gas. If there is no bed but the reactor is at a temperature above about 500° C., the foregoing procedure in starting a cold reactor without a bed may be followed, omitting, of course, the heating of the walls. Again, if there is a bed in the reactor but it is cold, the bed may be heated by a torch to at least 260° C. and ore feed then initiated with cessation of torch heating. And in the case of a cold reactor with no bed, the above-described method of starting under such conditions would be used.

The proportion of inert material needed in the bed during operation will depend, of course, upon the amount of gangue left after the sulfur has been driven from the ore. In general, starting with a bed of inert material fluidizing conditions can be maintained by controlling the rate of ore feed so that the average content of sulfur in the bed does not approach that of the fresh ore. Although specific conditions will vary according to the particular ore and the conditions prevailing in the bed, we now believe that with many native ores the rate of ore feed should be such that the sulfur content of the bed does not exceed about 20 percent by weight. In cases where the ore does not supply sufficient gangue for continued operation inert material may be fed to the bed, as in admixture with the ore. For such purpose ore to inert ratios may, in general, vary from 1:2 to 1:4, by weight.

For most purposes satisfactory results are to be had with ore and inert material in the form of particles from about 14 to 325-mesh size, and with the heating gas supplied at a linear velocity of from about 0.5 to 2.5 foot per second at reactor conditions, according to the fineness and density of the ore, to maintain the bed in a fluidized state.

In the foregoing embodiment of the invention air or other oxygen-containing gas constitutes the heating gas. In this embodiment the heat necessary for effecting vaporization of the free sulfur is, of course, derived from combustion of a portion of the sulfur in the ore. Where that practice is not economical, or for any other reason, the heating gas may be constituted of products of combustion, which may or may not be devoid of free oxygen, such as hot flue gases formed by the burning of solid, liquid, or gaseous fuels, in which case little or no sulfur is lost by combustion. Or, mixtures of flue gases with oxygen or air, depending upon the heating value of the fuel, may be used.

For maximum efficiency, and as will appear more fully hereinafter, utilization should be made of the heat content of the hot products from the reactor. Thus, as shown in FIG. 1, a portion of the product gases leaving the sulfur condenser may be returned through a conduit 9 to the ingoing heating gas. Additional heat may be recovered in other ways, as by recycling a part of the hot sulfur-free gangue with the incoming ore, or by passing the hot gangue in direct countercurrent contact with the incoming heating gas to preheat it. Various other ways of recovering waste heat will be clear to those familiar with the art, as by passing the exit gases from the condensing system, or the hot gangue, in indirect heat exchange with the ingoing heating gas. Still another possibility, and one desirable in arid localities, is to preheat the ingoing heating gas by using it instead of water for condensing the sulfur.

A feature of the invention resides in adjusting the heat supplied to the bed to permit its operation at a predetermined temperature and for recovery of a predetermined percentage of the sulfur in the ore. Assuming a native sulfur ore containing 34.8 percent of elemental sulfur, the following table represents the material balances for varying degrees of recovery:

| Pound Moles of Sulfur in Ore Fed to Reactor | Pound Moles of Air Fed to Reactor | Percent of Sulfur in Ore Which is Recoverable from Tail Gas as Elemental Sulfur |
| --- | --- | --- |
| 1 | 4.76 | 0 |
| 2 | 4.76 | 50 |
| 3 | 4.76 | 66.7 |
| 4 | 4.76 | 75.0 |
| 5 | 4.76 | 80.0 |
| 6 | 4.76 | 83.3 |
| 7 | 4.76 | 85.7 |
| 8 | 4.76 | 87.5 |
| 9 | 4.76 | 88.9 |
| 10 | 4.76 | 90.0 |
| 20 | 4.76 | 95.0 |

Assuming that it is desired to recover 83.3 percent of the sulfur, from the foregoing table it is found that the proportions needed are 6 pound moles of sulfur to 4.76 pound moles of air. Then from FIG. 2 it is seen that if heat is neither added to nor removed from the reactor the desired result will be had in the reactor at 700° K. Of course, adiabatic operation is not possible on a commercial scale. If it be assumed that the reactor loses about 200 B.t.u. per pound of sulfur recovered, then from FIG. 2 it is seen that for the selected recovery the actual operating temperature corresponding to this heat loss is about 600° K.

On the other hand, if there is recovered and returned to the bed an amount of heat corresponding to 200 B.t.u. per pound of sulfur recovered in excess of the heat lost from the reaction, then for 83.3 percent recovery the reactor will operate at about 770° K. Thus by applying the heat recovery practice in any of the ways indicated above, it is seen that control of the reactor is very flexible. For instance, if there is a heat loss of 200 B.t.u. per pound of recovered sulfur and a feedback of the same amount of heat, the reactor will operate at 700° K.

As a further example, assume that 90 percent recovery is desired. FIG. 2 shows that in this case the reactor must operate above about 625° K. for that is the dew point and at or below that temperature sulfur would condense inside the reactor and a portion of the sulfur would never leave the ore. Consequently, in this instance the net heat feedback to the reactor must amount to at least about 200 B.t.u. per pound of sulfur recovered, in which condition the bed temperature would be about 650° K.

By applying the principle exemplified by FIG. 2 it will be seen how operating conditions can be fitted easily to any particular predetermined state of facts.

Although the method has been described with reference to bottom feeding of the ore, it will be understood that it may be introduced laterally into the bed, as by mechanical means, or by gravity from above the bed. Likewise, the method is not confined to a single bed reactor but equally contemplates operation with two or more superimposed beds, as by feeding the ore to the topmost bed and causing it to flow from bed to bed by means of vertical overflow standpipes. Furthermore, although the method is intended chiefly for the treatment of ores of free sulfur, it is applicable also to those carrying a small amount as sulfide sulfur which, however, will not be recovered.

A major feature of the invention accrues from the excellent heat control that it affords. In passing hot gases through a fixed bed of ore, or even through a travelling but otherwise quiescent bed, there is had inevitably poor heat distribution and poor heat control due, for example, to channeling and related factors. Consequently, such practices are inefficient and economically undesirable. The fluosolids practice of this invention avoids those disadvantages, however, by providing for even heat distribution throughout the bed and for excellent heat control, both of which contribute and cooperate to confer high process efficiency.

According to the provisions of the patent statutes, the principle of the invention has been explained and illustrated and there has been described what is now considered to represent its best embodiment. However, it is to be understood that, within the scope of the appended claims, the invention may be practiced otherwise than as specifically illustrated and described.

What is claimed is:

1. That method of recovering sulfur from a native ore containing it at least preponderantly in elemental, free form comprising forming a bed of the finely divided ore and added inert particulate inorganic material in a vertical reactor, passing upwardly through said bed an inert heating gas to heat the bed above the dew point of sulfur and thereby to volatilize the free sulfur from the ore, said gas being supplied at bed fluidizing velocity, continuously feeding the finely divided ore to said bed at a rate such that the sulfur content of the bed does not exceed about 20 percent, continuously withdrawing product gases containing sulfur vapor from above the bed, condensing and recovering sulfur from said product gases, withdrawing gangue from the bed separately from said product gases, and adjusting the heat supplied to the bed to effect predetermined temperature of operation and sulfur recovery.

2. That method of recovering sulfur from a native ore containing it at least preponderantly in elemental, free form comprising forming a confined bed of added inert inorganic particulate material and the finely divided ore in the form of particles from about 14 to 325-mesh, passing upwardly through said bed an inert heating gas to heat the bed above the dew point of sulfur and thereby to volatilize the free sulfur from the ore, said gas being supplied at a linear velocity to maintain the bed as a dense fluidized suspension, continuously feeding the finely divided ore to said bed at a rate such that the sulfur content of the bed does not exceed about 20 percent, continuously withdrawing product gases containing sulfur vapor from above the bed, condensing and recovering sulfur from said product gases, withdrawing gangue from the bed separately from said product gases, and adjusting the heat supplied to the bed to effect predetermined temperature of operation and sulfur recovery, the feeding of said ore being at a rate to maintain the sulfur content of the bed not over about 20 percent.

3. A method according to claim 1, said heating gas being hot products of combustion.

4. That method of recovering sulfur from a native ore containing it at least preponderantly in elemental, free form comprising forming in a vertical reactor a bed of added inert inorganic particulate material and the finely divided ore in the form of particles from about 14 to 325-mesh, passing upwardly through said bed an inert heating gas to heat the bed above the dew point of sulfur and thereby to volatilize the free sulfur from the ore, said gas being supplied at a velocity to maintain the bed as a dense fluidized suspension, continuously feeding the finely divided ore to said bed at a rate such that the sulfur content of the bed is not over about 20 percent, continuously withdrawing product gases containing sulfur vapor from above the bed, condensing and recovering sulfur from said product gases, withdrawing gangue from the bed separately from said product gases, and passing the ingoing heating gas in heat exchange relationship with at least one member of the group consisting of hot gangue and hot product gases to adjust the heat supplied to the bed to effect predetermined temperature of operation and sulfur recovery.

5. In a method of recovering sulfur from a native ore containing it at least predominantly as elemental, free sulfur in which the free sulfur is vaporized from a fluidized bed containing the ore, with separate removal of the gangue, the step comprising feeding said ore to said bed in admixture with an added inert inorganic particulate material in an amount such that the ratio of ore to inert material varies from, by weight, 1:2 to 1:4.

References Cited in the file of this patent

UNITED STATES PATENTS

| | | |
|---|---|---|
| 1,409,338 | Fenton | Mar. 14, 1922 |
| 2,637,629 | Lewis | May 5, 1953 |
| 2,700,592 | Heath | Jan. 25, 1955 |
| 2,729,598 | Garbo | Jan. 3, 1956 |
| 2,872,294 | Eads et al. | Feb. 3, 1959 |

FOREIGN PATENTS

| | | |
|---|---|---|
| 886,593 | Germany | Aug. 17, 1953 |